US010748117B1

(12) United States Patent
Zhuo et al.

(10) Patent No.: US 10,748,117 B1
(45) Date of Patent: Aug. 18, 2020

(54) COLLABORATION PORTAL

(71) Applicant: Wells Fargo Bank, N.A., San Francisco, CA (US)

(72) Inventors: Yi M. Zhuo, Monroe, NC (US); Lin-Tine David Li, Charlotte, NC (US); H. Brock Kolls, Alpharetta, GA (US); Robert Christian Brantley, Winston Salem, NC (US); Chris Gerard Baker, Mooresville, NC (US); Regina W. Timmons, Greensboro, NC (US); James Albert Foulis, Charlotte, NC (US); Tambra Nichols, Charlotte, NC (US)

(73) Assignee: Wells Fargo Bank, N.A., San Francisco, CA (US)

(*) Notice: Subject to any disclaimer, the term of this patent is extended or adjusted under 35 U.S.C. 154(b) by 162 days.

(21) Appl. No.: 15/654,202

(22) Filed: Jul. 19, 2017

(51) Int. Cl.
*H04M 3/42* (2006.01)
*G06Q 10/10* (2012.01)

(52) U.S. Cl.
CPC .......... *G06Q 10/10* (2013.01); *G06Q 10/107* (2013.01); *H04M 3/42357* (2013.01); *H04M 3/42374* (2013.01); *H04M 3/4211* (2013.01); *H04M 3/42059* (2013.01); *H04M 3/42093* (2013.01); *H04M 3/42365* (2013.01)

(58) Field of Classification Search
None
See application file for complete search history.

(56) References Cited

U.S. PATENT DOCUMENTS 6,430,542 B1  8/2002  Moran
6,442,693 B1  8/2002  Sandgren et al.
8,498,913 B2  7/2013  Jenson et al.
(Continued)

FOREIGN PATENT DOCUMENTS

WO   WO-0063813 A1 * 10/2000 ............. G06Q 40/02
WO   WO-0063813 A1   10/2000

OTHER PUBLICATIONS

Gardner, Randy, et al., "Making the Online Estate Planning Process Work", Financial Planning Association, [Online]. [Accessed Dec. 19, 2016]. Retrieved from the Internet: <URL: https://www.onefpa.org/journal/Pages/DEC14-Making-the-Online-Estate-Planning-Process-Worô€€.aspx>, 4 pgs.

*Primary Examiner* — Cai Y Chen
(74) *Attorney, Agent, or Firm* — Schwegman Lundberg & Woessner, P.A.

(57) ABSTRACT

A system and related method manage a collaboration portal. The method comprises receiving, from a transferor resource, transfer information, which comprises identification of resources for a future transfer, identification of transferees comprising the transferees to whom the resources will transfer to in the future, transfer instructions related to the future transfer of the resources to the transferees, and access instructions that allow the transferees to access the resource transfer information. The resource transfer information is stored in a memory of the collaboration portal. The method further comprises, receiving, from a transferee, via a network interface, a request to access the resource transfer information, and providing, to the transferee, limited access to the resource transfer information based on the access instructions, using a processor of the collaboration portal.

20 Claims, 4 Drawing Sheets

(56) References Cited

U.S. PATENT DOCUMENTS

| | | | |
|---|---|---|---|
| 2002/0111946 A1* | 8/2002 | Fallon | G06Q 10/10 |
| 2003/0033227 A1* | 2/2003 | Heiser | G06Q 10/10 |
| | | | 705/35 |
| 2003/0182290 A1 | 9/2003 | Parker | |
| 2004/0138972 A1 | 7/2004 | Mendelsohn | |
| 2007/0192114 A1 | 8/2007 | Parpala | |
| 2008/0147567 A1 | 6/2008 | Perry et al. | |
| 2009/0171828 A1 | 7/2009 | Molinsky et al. | |
| 2010/0057633 A1 | 3/2010 | Zafar et al. | |
| 2011/0231211 A1 | 9/2011 | Griffin | |
| 2014/0020072 A1* | 1/2014 | Thomas | H04L 67/10 |
| | | | 726/7 |

* cited by examiner

COLLABORATION PORTAL

TECHNICAL FIELD

A system and method are provided for operating a collaboration portal and associated databases in the context of a future transfer of resources between entities.

BACKGROUND

In situations where it is desirable to facilitate a future transfer of resources from one entity to other entities, it is often difficult to ensure that the transfer ensues in an optimal way, particularly where the nature of the future transfer of the resources is complex and when resources to transfer may have attributes that change.

Such a situation may occur when, for example, a benefactor desires to transfer their assets to various beneficiaries under certain conditions, like the death of the benefactor. In these types of situations, coordinating such resource transfers may become complex, particularly where aspects of the resources, such as value, and circumstances associated with the resources, change over time. Furthermore, communications in this context may be difficult given limited access that participants may have to relevant information about the resources.

SUMMARY

A computer-implemented method is provided for managing a collaboration portal transfer database. The method comprises receiving, from a transferor resource, transfer information, which comprises a list of resources for a future transfer, transferees comprising the transferees to whom the resources will transfer to in the future, transfer instructions related to the future transfer of the resources to the transferees, and access instructions that allow the transferees to access the resource transfer information. The resource transfer information is stored in a memory of the collaboration portal. The method further comprises, receiving, from a transferee, via a network interface, a request to access the resource transfer information, and providing, to the transferee, limited access to the resource transfer information based on the access instructions, using a processor of the collaboration portal.

A system is also provided for managing a collaboration portal transfer database. The system comprises a hardware processor, a storage device comprising a nonvolatile memory and is connected to the hardware processor. The memory comprises resource transfer information, made up of a list of resources for a future transfer, transferees comprising the transferees to whom the resources will transfer to in the future, transfer instructions related to the future transfer of the resources to the transferees, and access instructions that allow the transferees to access the resource transfer information. The system further comprises a network interface via which a request to access the resource transfer information is received from a transferee. The system limits access to the resource transfer information based on the access instructions is provided, utilizing the processor, to the transferee.

A non-transitory computer-readable storage medium is provided that includes instructions that when executed by a processor, cause the processor to execute the above-described method.

BRIEF DESCRIPTION OF THE DRAWINGS

In the drawings, which are not necessarily drawn to scale, like numerals may describe similar components in different views. Like numerals having different letter or numeric suffixes may represent different instances of similar components. The drawings illustrate generally, by way of example, but not by way of limitation, various embodiments discussed in the present document.

DETAILED DESCRIPTION

A collaboration portal may be provided that, for example, facilitates the assignment of resources and enhances communications between a transferor and a transferee. This portal may further search for potential transferees that may be provided to the transferor for consideration as actual transferees. The portal may also facilitate communications between a transferor and the potential transferees. Various tools are provided to assist both the transferor and transferee to make better use of the resources stored in the portal.

Figure 1:
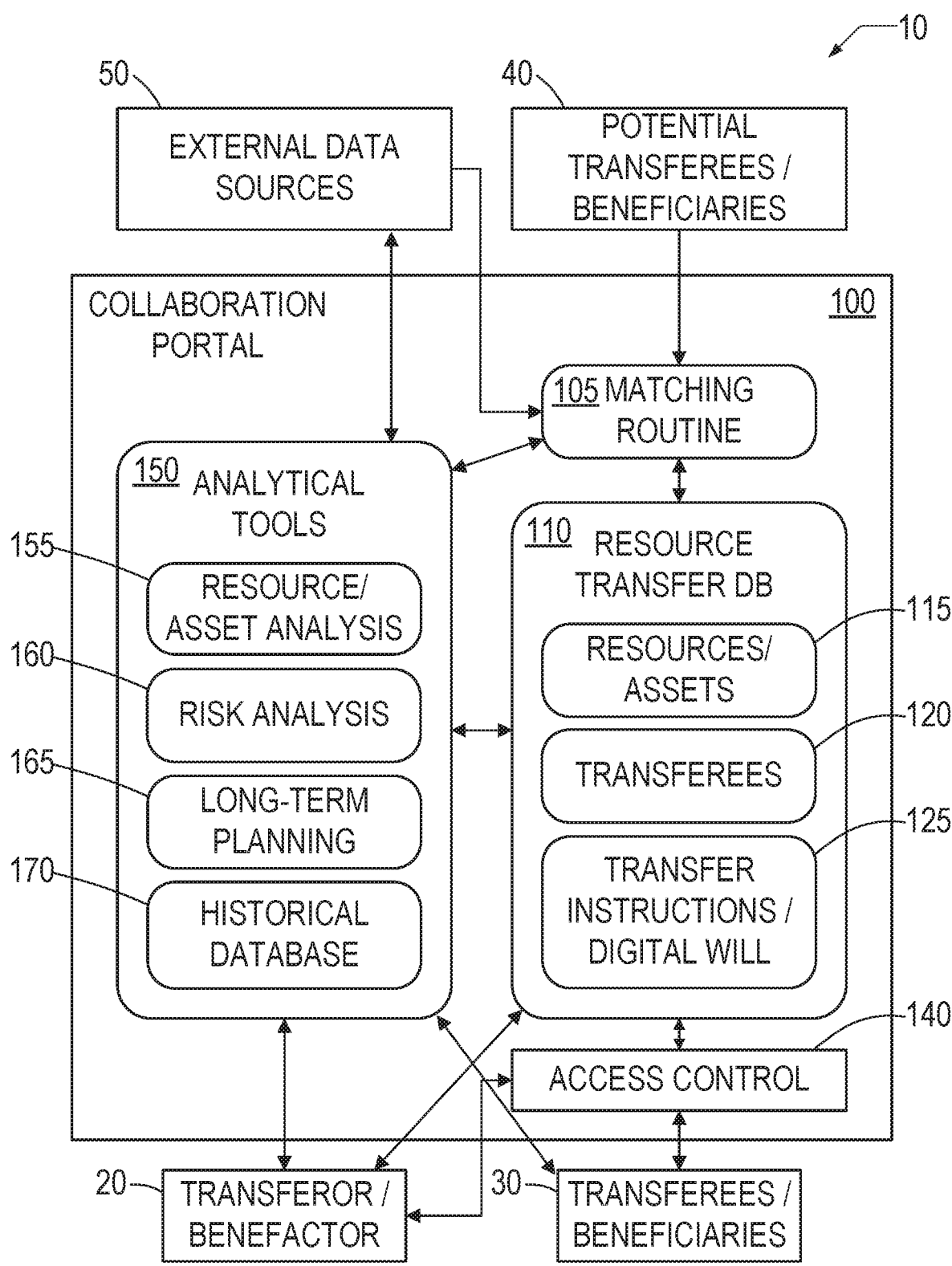
FIG. 1 is a block diagram that illustrates an implementation of a collaboration portal system.

FIG. 1 illustrates one implementation of a collaboration portal system 10, which is a technical system that includes the collaboration portal 100 along with external entities that interface with it, for example, the transferor 20, transferee 30, and other external entities, such as potential transferees 40, and external databases 50. It also includes networks that interconnect the entities and enable communication between them.

The collaboration portal 100 may be implemented as a web-based application, as a mobile application, or any form of a client-server architecture. For example, a user (transferor 20, transferee 30, or other person) may access a web site that serves as an interface for the collaboration portal 100. After logging in to authenticate themselves to the portal 100, the user may view a screen that displays resources stored within the portal 100 and various metadata attributes associated with those resources. The collaboration portal 100 may comprise tools that allow viewing, sorting/organizing, and updating the metadata associated with the objects.

Similarly, the collaboration portal 100 may be implemented as an app on a smartphone, with a user interface portion being displayed on it, and the data and tools for interacting with a server-side portion of the collaboration portal 100 may be accessed over a network. Any of these mechanisms, or any other similar ones, may be used to present information related to the collaboration portal 100 to the user.

An implementation described herein is the application of such a collaboration portal system 10 to a system that deals with asset transfers, and in particular, with a benefactor who wishes to transfer assets, which are a type of resources, to beneficiaries at some time in the future. In this case, the transferor of the system 10 described above is the benefactor 20, the transferee is the beneficiary 30, and the resources to be transferred are the benefactor's assets. However, this is only one implementation, and the system 10 is not limited to an application involving a transfer of assets between a benefactor 20 and beneficiaries 30, but could involve any resource transfer between entities that wish to collaborate on the nature and aspects of the resource transfers. The types of assets may be numerous, and include, for example, existing real estate property, with potential linkages to external data sources used to detail or value the property, stocks, bonds, accounts, art, jewelry, animals, private companies, and even items such as contacts.

In one implementation, a benefactor 20 has a number of assets that he wishes to transfer to one or more beneficiaries 30 upon the occurrence of an event. Typically, the event would be the death of the benefactor 20, and in known systems, the instrument for transferring the assets would be a will. However, the event may be anything and does not necessarily have to relate to the benefactor 20. For example, the transfer could occur when a beneficiary 30 achieves some goal, such as completing college or getting married.

The collaboration portal 100 makes organizing the transfer easy. In one implementation, information about the asset transfer is located in a resource transfer database 110, which may contain resource transfer information, including, for example, an identification (e.g., in the form of a list) of resources/assets 115 that the benefactor 20 wishes to transfer in the future. It may contain an identification (e.g., in the form of a list) of beneficiaries/transferees 120 that the benefactor 20 wishes to transfer the assets to. To provide such a list, the benefactor may access, for example, a web page on the collaboration portal and select the assets to add/edit metadata associated with the assets.

The database 110 may also contain transfer instructions 125, which may be in the form of a digital will. The digital will 125 may be an electronic word processing document. However, it may be beneficial to permit a tagging of the digital will 125 to assist in the retrieval and modification of various will sections. The tagging may include semantic tags as metadata that identify sections of the will, beneficiaries of the will (and their respective assets, including a compensation statement), access control information for various portions of the will, a description of the assets, etc.

The tagging could also provide for conditions of transfer (e.g., age, college degree) and tags to assist in tax reporting. The collaboration portal 100 may be configured to monitor how well the beneficiaries 30 are tracking to meet conditions associated with the transfer of the assets. The collaboration portal 100 may also be used to assist the beneficiaries 30 in disposing of their assets if they do not want them. For example, the collaboration portal 100 could be used by the benefactor 20 to tag an art collection with an art gallery that may be willing to buy the art collection in the event that the assigned beneficiary 30 did not want to keep the art collection.

The use of these tags could make the digital will 125 more searchable and allow it to be restructured or reordered in real time, and the tags may be used as descriptive information in a matching routine 105, described in more detail below. The tagging may also identify "bookkeeping" information, such as law firms involved, key dates (for example, dates related to transfers, conditions, etc.), revision history, who is the keeper of the will, etc. The benefactor 20 may, through the collaboration portal 100, request changes to the digital will 125 or request help or information or clarity around certain digital will elements. When changes to the digital will 125 require witnesses, access to the portal 100 for witnesses may be provided, and authenticated digital signatures may be attached to the digital will 125. The tagging could also ensure that the correct beneficiary 30 or individual is associated with the resource, providing correct name or group, contact information, etc., to facilitate execution of the digital will 125.

The collaboration portal 100 may provide access to the contents of the resource transfer database 110 to the beneficiaries 30. This permits a significant degree of transparency to facilitate communications between the benefactor 20 and the beneficiaries 30. However, complete transparency may not be desirable for a number of reasons. For example, if one child were to receive more of the assets in an inheritance, the parent may not want the children to be aware of this. Thus, the system may provide access control 140 in which the benefactor 20 may specify which of the beneficiaries 30 (and possibly others 40, 50) may access what information in the resource transfer database 110, thus providing limited access to the information. The access control 140 may utilize traditional username and password authentication, but may also utilize biometric data, such as voice, fingerprint, iris, etc. The level of authentication may vary based on the value of assets being transferred to the beneficiary. The access control 140 could allow anonymization of sensitive information, such as the presence of a mistress among the benefactors 30.

For example, each of two children (beneficiaries 30) may be able to see the assets designating them for transfer and possibly the value of those assets, without being able to see the assets of the other. In this way, the beneficiary 30 may track their designated asset but not those of others.

In many cases, all benefactors 30 are known to the benefactor 20. However, this is not always the case. For example, a benefactor 30 may have an art collection that she would like to donate to a museum. However, she is not sure which museum would be most suitable for her art collection. To assist the benefactor 30 in locating suitable beneficiaries, the collaboration portal 100 may provide a matching routine 105 for helping to match potential beneficiaries 40 with assets. In one implementation, descriptive information may be provided by the transferor 20 as metadata tags associated with the assets. In another implementation, the descriptive information may be obtained from some other source. This descriptive information may be used as search criteria for database queries, web searches, and the like. Potential beneficiaries 40 may submit their information to the collaboration portal 100 in advance of inquiries so that the collaboration portal 100 does not have to access external data in order to respond to a match inquiry at the time of inquiry. In one implementation, the potential beneficiaries 40 may be provided limited access, via access control 140, to assets that might be of interest to them. This limited access could be in a form of anonymized data, or values associated with the asset.

In an alternative implementation, the matching routine 100 may use a network, such as the Internet, to access potential beneficiaries based on the inquiry.

Using the above example, if the benefactor 30 has an art collection asset that is heavily weighted with impressionist art, the matching routine 105 could locate museums that specialize in or emphasize impressionist art as those being potential matches for the art collection. Other criteria may be used by the matching routine 105, such as the reputation of the museum or the rates the museum charges for entry.

The matching routine 105 may use various mechanisms to determine a degree of matching between a particular asset and potential beneficiaries 40. It may utilize a weighted factor analysis that looks at keywords, or it may apply artificial intelligence techniques and/or utilize heuristic rules when considering a degree of matching. Additionally, the benefactor 20 may provide additional emphasis criteria to help determine the weighting—for example, the benefactor may indicate a preference for hospitals or organizations that provide food and shelter for the homeless. The matching routine 105 could further utilize external data sources 50, such as social media, news web sites, government and public databases, web crawlers, etc. to obtain information about potential matching beneficiaries, but it may also utilize information that has been provided to the collaboration portal 100 by the benefactor 20.

In one embodiment, the organization providing the collaboration portal 100 services may be able to provide recommended potential beneficiaries 40, based on its knowledge of both the potential beneficiaries 40 and benefactor 20. It could also provide a premium for potential beneficiaries who are already engaged with the organization providing the collaboration portal 100.

In addition to providing organizational matches for the asset, the matching routine 105 may also attempt to locate relatives that the benefactor 20 may consider an appropriate benefactor 30. To that end, the matching routine 105 may try to connect to external data sources 50, such as genealogical databases (e.g., containing GEDCOM files), public records, and the like, to locate relatives that the benefactor 20 may have forgotten about.

The matching routine 105 may then present a list of potential beneficiaries 40 to the benefactor 20, possibly with a description and an indication of the relevance or degree of matching. For example, a first and second museum might make the list of potential beneficiaries 40, but the first may specialize in modern art, whereas the second may specialize in impressionist art. Both may be listed, but the second museum specializing in impressionist art may be given a higher ranking or correlation as being a better fit for the benefactor's 20 impressionist art collection asset. Similarly, an identified niece might have a higher ranking or correlation than a second cousin, once removed, due to the family tree proximity of the niece. The external data sources 50 may include genealogical databases, social media databases, government databases, and other public databases.

Recommendations made by the matching routine 105 may be based on other criteria, for example, a percentage of proceeds used for administration, a popularity ranking among beneficiaries, or level of involvement with the owner of the collaboration portal 100. In one implementation, the potential beneficiaries 40 may be allowed to contact and/or communicate with the benefactor 20 the desirability of having them as a benefactor.

Once the benefactor 20 has reviewed the list of potential beneficiaries, she may decide to designate one or more of the potential beneficiaries as actual beneficiaries 30. A checkbox, button, or any form of user interface mechanism may be provided to the benefactor to designate the potential beneficiary as an actual beneficiary.

One potential additional role for the matching routine 105 according to an implementation, may be to assist the benefactors 30 for whom a transfer of assets has already occurred, to locate a suitable purchaser for the asset. For example, if the benefactor 30 received a valuable automobile when her father died, but then decided she would rather have the cash, the matching routine 105 could present a list of potential purchasers (or management companies, if the benefactor would rather receive an income stream from allowing others to use the asset, such as renting a home). In an alternative implementation, the owner of the collaboration portal could auction off the assets and provide the proceeds to the beneficiaries 30.

The collaboration portal 100 may then provide a too having an easy way for the benefactor 20 to assign some of her assets to one or more of the beneficiaries 30. The beneficiaries 30 may include only those initially provided by the benefactor and/or those selected from the list of potential beneficiaries 40. In one example, the beneficiaries 30 are listed on one side of a display monitor, and the assets are listed on another side. The benefactor 20 may then drag and drop asset icons/graphics onto beneficiary icons/graphics. The drag and drop could also allow an additional tagging of information to accompany the linking between beneficiary 30 and asset.

More than one asset may be assigned to a beneficiary 30, and more than one beneficiary 30 could be assigned to an asset (in which case, additional information about the division may be provided). When an asset is assigned to a beneficiary 30, an alert may be created. This alert may be sent to the beneficiary 30 and/or the benefactor's lawyer so that any legal necessities associated with the transfer may be initiated. To the extent that a lawyer does not need to be involved with the transfer, smart digital witnesses could be provided who may witness the transfer with an authorized digital signature, and the assignment does not complete until the digital witnesses verify it.

Although a drag and drop interface is one mechanism that may be utilized, the invention is not so limited, and any form of an interface may be provided that permits the above-described assignment to take place.

The collaboration portal 100 may further comprise analytical tools 150 that may be used by the benefactor 20 and/or the beneficiaries 30. Once such tool is an asset analysis tool 155, which may be usable by both the benefactor 20 and beneficiary 30. The asset analysis tool 155 may provide the valuation of assets as they change over time. For example, an asset that is a piece of property could be updated based on a sale of comps in the area, or an asset that is a vehicle could change based on a bluebook price. Bank account information may be updated in real time by the asset analysis tool 155.

The asset analysis tool 155 may provide a way for the benefactor 20 to achieve a particular balance or ratio of allocations between the beneficiaries 30 in order to promote fairness or achieve a certain goal. It could also provide the beneficiaries 30 with a more detailed understanding as to why the value of their assets change. For example, it could indicate that a reduction in the value of their assets from $200K to $175K is due to a housing slump, as opposed to the benefactor reallocating the $25K elsewhere. However, the asset analysis tool 155 may also be subject to access control 140, which may be utilized to promote a sense of fairness when in fact one beneficiary sibling may be receiving more than another.

Another analytical tool 150 may be a risk analysis tool 160, which may be used by the benefactor 20 in planning the assignments of assets to beneficiaries 30. Although this tool could incorporate traditional wealth planning (e.g., high-risk investments, such as stocks, and low-risk investments, such as municipal bonds), it may also be utilized to indicate less traditional assessments of risk. For example, leaving assets to young children, even incorporating a guardian or trustees in the plan, may represent more risk to the handling of the assets than leaving assets to adult children. The risk analysis tool 160 may provide indications of risk and also make recommendations when more risky alternatives, such as using non-family trustees, are included. The risk analysis tool 160 may provide checklists that may be utilized to help mitigate against more risky assignments. It may present a risk profile to the benefactor 20 that extends into the future, showing, for example that assets such a car and house become less of a financial risk as the benefactor 20 ages. It may be used to recommend investments, strategies, mentors, amounts to put in retirement accounts, etc. Risk may also be a function of time (change over day, week, month, year, lifetime), maximum percentage, or dollar gain/loss.

A further analytical tool 150 may be a long-term planning tool 165. This tool could incorporate features such as elder care planning, and could make such features transparent so that certain beneficiaries 30 could understand precisely how the money is being allocated and make age-based adjustments that are based on the age of the benefactor or beneficiary. For example, the long-term planning tool 165 could suggest maintaining $300K up until age 70 for a retirement home, maintaining $200K up until age 80, and maintaining $100K up until age 90. Beneficiary 30 children could see how this dollar amount changes over the years and make their own plans accordingly. It could also provide information to the beneficiaries 30 as to recommend which assets they may wish to sell first, based on market value, tax treatment, etc.

The long-term planning tool 165 may also incorporate a loan feature that permits a beneficiary 30 to take out a loan against an asset that they have been designated to receive at a future date. For example, if the beneficiary 30 has been assigned to receive a rare automobile upon the benefactor's 20 death, the beneficiary 30 may be able to take out a loan for a new home, using the future inheritance of the rare automobile as collateral. In one implementation, the conditions for such a loan may be specified by the benefactor 20. For example, the benefactor may specify that such a loan may be taken out for a new home or education, but may not be taken out for a vehicle.

Another analytical tool 150 may be a historical database 170. This historical database may use, for example, anonymized information about what other similarly situated individuals have done in terms of allocating resources, possibly with an indication, where known, of the results of such allocations. For example, it may illustrate a difference between investing assets in stocks vs. bonds for a thirty-year old. It may also implement a knowledge base that incorporates artificial intelligence routines to make recommendations and incorporate a questions/answers utility to help benefactors 20 (and beneficiaries 30) better manage their assets.

The collaboration portal 100 may facilitate communications between the benefactor 20 and beneficiaries 30 (including potential beneficiaries 40). It may allow beneficiaries to join in the process of allocation to indicate certain assets that they might prefer over others. The collaboration portal 100 may be utilized to inventory the assets of the benefactor 20 and provide reports of the assets, either on demand, periodically, or in response to some event. It may utilize a voice-based intelligent interface (such as Siri) to ease interactions, but may also use more standard tools like web-based chat forums, email, etc. It may also include an avatar image of the benefactor 20 and/or beneficiaries 30, and users may be able to interact in a virtual reality (VR) environment. The benefactor 20 may also include messages, e.g., via the avatar, to pass on to the beneficiaries 30 after he is gone. These messages could be simply well wishes or could contained detailed information as to why certain decisions related to assets were made.

The collaboration portal 100 may be multi-generational so that beneficiaries may build on it over generations. It may include an inheritance meter for metering out distributions of assets over time, and permit skipping a generation, if desired.

Figures 2, 3:
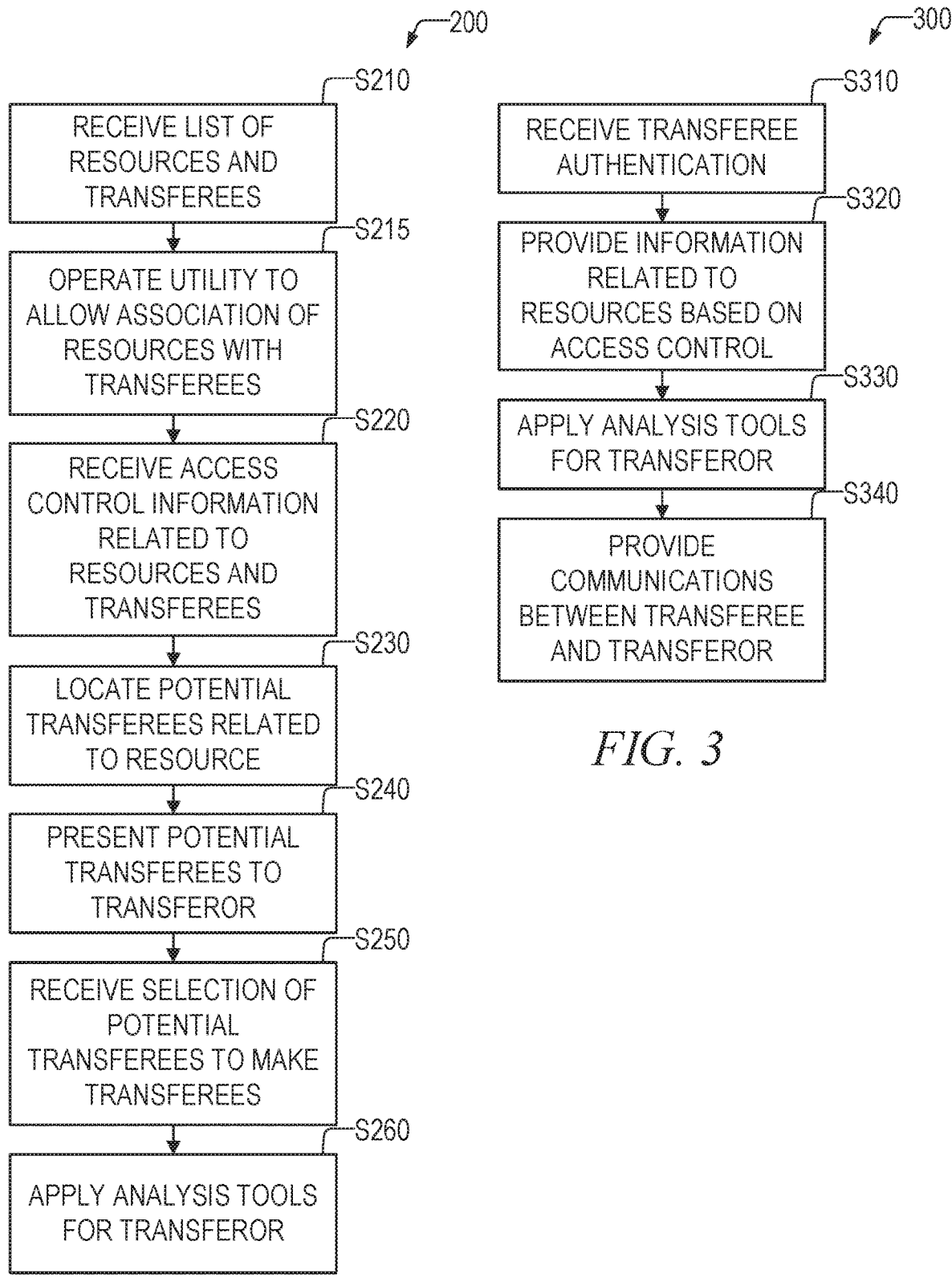
FIG. 2 is a flowchart that illustrates an example process relating primarily to transferor activities.
FIG. 3 is a flowchart that illustrates an example process relating primarily to transferee activities.

FIG. 2 is a flowchart that summarizes an implementation of a process 200 that may be used by the collaboration portal 100 when interacting with a transferor 20. In operation S210, the portal 100 may receive a list of resources and transferees 30 from the transferor 20. In an example web-based implementation discussed above, the transferor 20 may enter these lists and related descriptions as metadata into, for example, a web-based form shown on a display of their computer that is connected via a network to a server of the collaboration portal 100. In another implementation, the resource and transferee information may be imported from another source, such as a Microsoft Excel spreadsheet or other inventory program. The data for the resources and transferees may be placed in the resource transfer database 110 that resides, for example, on the collaboration portal 100 server in a memory and/or a non-volatile data store, and may be segregated into the resources/assets data 115, transferees data 120, and transfer instructions/digital will 125.

In operation S215, a utility may be provided to the transferor 20 for associating the resources with the transferees 30. This may be a tool that is a part of the collaboration portal 100. By way of example, a web-based screen display could present a list, or some other form of visual representation, of resources on the left-hand part of the display, and the transferees 30 on the right-hand of the display, and the transferor 20 could drag and drop a resource onto one or more transferees 30, and/or could drag and drop a transferee 30 onto one or more resources. A line could be displayed connecting the two, and selection of the line could prompt the transferor 20 to provide additional information about the connection (e.g., conditions related to the transfer, timing, etc.) Other display mechanisms showing a connection or relationship between a transferee 30 and a resource could be utilized as well, such as a mouse hover revealing, for example, a semi-transparent window with related information.

In operation S220, the portal 100 may receive access control information from the transferor 20 in order to restrict access to information about the resources and their relationships with the transferees 30. This could be performed, according to an implementation, by the transferor 20 selecting one or more entities that may comprise each individual resource, a group of resources, each individual transferee, and/or a group of transferees, and specifying read/write/change/delete/control attributes (or any other type of control access attribute) as it relates to the respective entity. The access control information 140 could be stored in a memory of the collaboration portal 100.

By way of example, the transferor could restrict transferees 30 from writing any changes as to the assignment of a resource, but could allow transferees to write notes related to a resource. In another example, the transferor 20 restricts viewing access by a transferee 30 to only those resources that have been assigned to the transferee 30. In this way it is possible to prevent disputes when one transferee 30 is given more than another.

In operation S230, the portal 100 may locate potential transferees 40 related to a particular resource. This may be performed by the matching routine 105 as described above.

In operation S240, this list of potential transferees 40 may be presented to the transferor 20 by way of, for example, a listing on the web page of the collaboration portal 100. The transferor 20 may select, using, for example, a mouse interacting with the display listing, some of the potential transferees 40 to make them actual transferees 30. In operation S250, the system receives the selected potential transferees 40 and converts them into actual transferees 30 by, for example, copying relevant information into the transferees data store 120.

In operation S260, the system may apply various analysis tools 150 to assist the transferor 20 in managing the resources, which may include the resource/asset analysis tool 155, the risk analysis tool 160, the long-term planning tool 165, and the historical database 170, as described above. The availability of the analytical tools 150 may be presented to the user as selectable elements on a web-based display of the collaboration portal 100.

FIG. 3 is a flowchart that summarizes an implementation of a process 300 that may be used by the collaboration portal 100 when interacting with a transferee 30. Similar to the above described access scenarios for the transferor 20, the transferee 30 may interact with the collaboration portal 100 via a web-based application, a smart phone app. or any other form of a system that may implement, for example, a client-server architecture.

In operation S310, the portal 100 receives authentication for the transferee 30. This may be performed by a transferee 30 accessing a web page of the collaboration portal 100 and entering in a username and password or presenting some biometric data, for example, in a manner that may be similar or different from the authentication of the transferor 20.

Once the transferee 30 is authenticated, in operation S320, the portal may provide information to the transferee 30 related to the resources based on access control restrictions. For example, the web page may present a list of assets 115 that the transferee 30 has been assigned by the transferor, along with related metadata. The web page may also present portions of the transfer instructions/digital will 125 that are relevant to the transferee 30.

In operation S330, the portal 100 may apply analysis tools 150 to the resources for the transferee 30. Although certain analytical tools 150 may be primarily for use by the transferor 20, other analytical tools 150 may be useable by both the transferor 20 and the transferee. For example, the transferee 30 may request, by clicking an analysis menu item presented on the web page, a value analysis of a particular resource utilizing the resource/asset analysis tool 155.

In operation S340, the portal 100 may provide for communications between the transferee 30 and the transferor 20. For example, in one implementation, the transferee 30 may click on a "message" menu item on the collaboration portal 100 web page to send a message to the transferor 20 about a particular asset. The collaboration portal 100 may open another window, for example, with a text entry box into which the transferee could enter a message to send to the transferor 20. In another implementation, the collaboration portal 100 may open a blank email message directed towards the transferor 20 and into which the transferee 30 may enter the message. In another implementation, a metadata entry may be provided by the transferee 30 and associated with the asset. The communications may be in any form that assists the transferee 30 to exchange information with the transferor or possibly other transferees.

General Computer and Network Architecture

Figure 4:
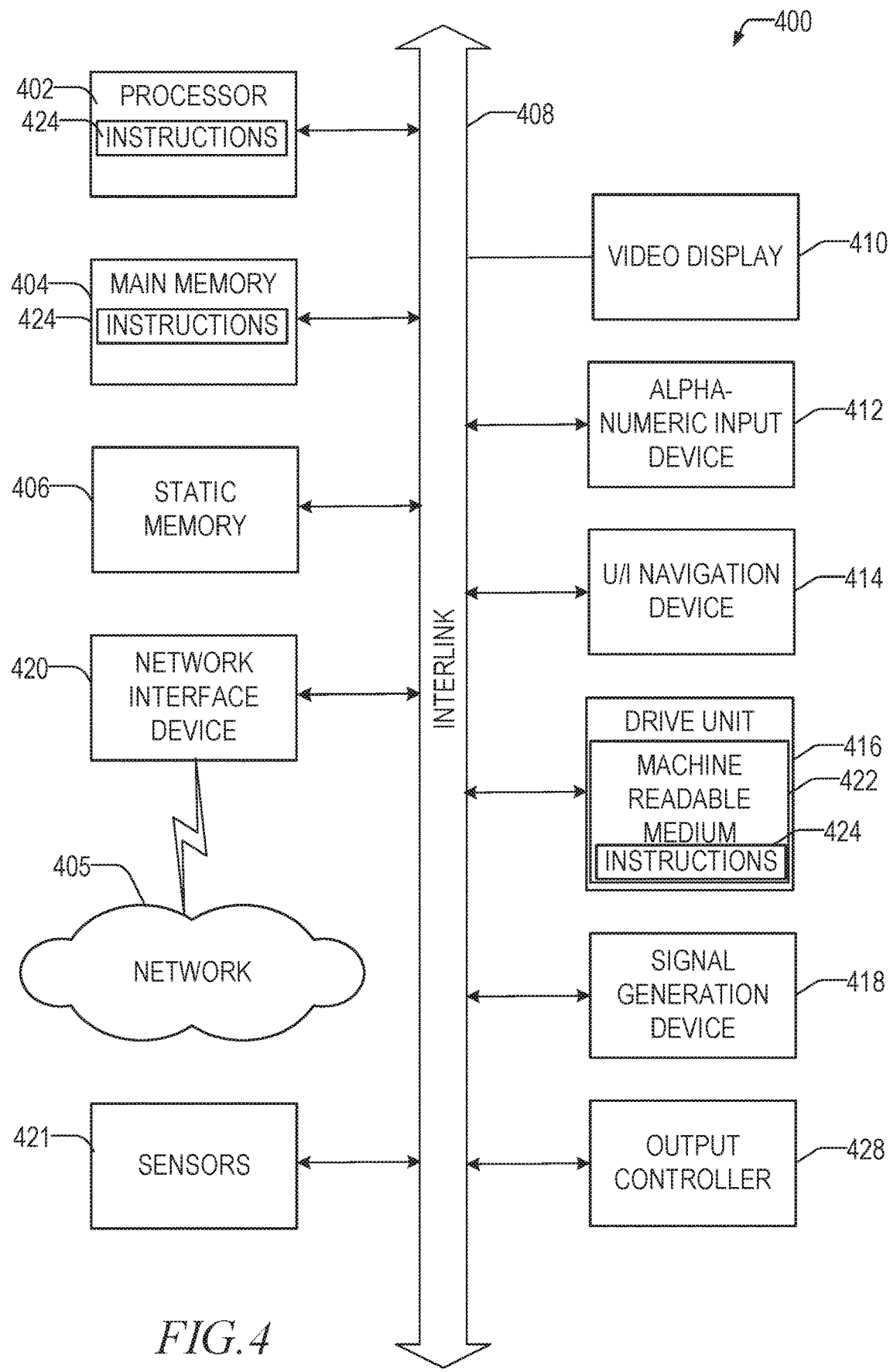
FIG. 4 is a block diagram illustrating a machine that may be a computer on which various processes described herein may be performed.

To describe some configurations in greater detail, reference is made to examples of hardware structures and interconnections usable in the designs of the present disclosure. FIG. 4 is a block diagram illustrating a machine that may be a computer on which various processes described herein may be performed, such as a processor of the collaboration portal 100 described above. The machine (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The machine 400 may further include a display unit 410, an alphanumeric input device 412 (e.g., a keyboard), and a user interface (UI) navigation device 414 (e.g., a mouse). In an example described herein, the display unit 410, input device 412 and UI navigation device 414 may be a touch screen display. The machine 400 may additionally include a storage device (e.g., drive unit) 416, a signal generation device 418 (e.g., a speaker), a network interface device 420, and one or more sensors 421, such as a global positioning system (GPS) sensor, compass, accelerometer, or other sensor. The machine 400 may include an output controller 428, such as a serial (e.g., universal serial bus (USB)), parallel, or other wired or wireless (e.g., infrared (IR), near field communication (NFC), etc.) controller connection to communicate or control one or more peripheral devices (e.g., a printer, card reader, etc.).

The storage device 416 may include a machine readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the machine 400. In an example, one or any combination of the hardware processor 402, the main memory 404, the static memory 406, or the storage device 416 may constitute machine readable media.

While the machine readable medium 422 is illustrated as a single medium, the term "machine readable medium" may include a single medium or multiple media (e.g., a centralized or distributed database, and/or associated caches and servers) configured to store the one or more instructions 424.

The term "machine readable medium" may include any medium that is capable of storing, encoding, or carrying instructions for execution by the machine 400 and that cause the machine 400 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 424 may further be transmitted or received over the communications network 405 using a transmission medium via the network interface device 420. The term "transmission medium" is defined herein to include any medium that is capable of storing, encoding, or carrying instructions for execution by the machine, and includes digital or analog communications signals or other medium to facilitate communication of such software.

The machine 400 may communicate with one or more other machines 400 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, virtual private networks (VPN), or any other way of transferring data between machines 400. In an example, the network interface device 420 may include one or more physical jacks (e.g., Ethernet, coaxial, or phone jacks) or one or more antennas to connect to the communications network 426.

In an example, the network interface device 420 may include a plurality of antennas to wirelessly communicate using at least one of single-input multiple-output (SIMO), multiple-input multiple-output (MIMO), or multiple-input single-output (MISO) techniques. In some examples, the network interface device 420 may wirelessly communicate using Multiple User MIMO techniques.

A wide variety of computing devices may constitute a machine 400, as described herein. The following list includes a variety of devices that may fit the definition of a machine 400: a personal data assistant (PDA), a cellular telephone, including a smartphone, a tablet computing device, a laptop computer, a desktop computer, a workstation, a server computer, a mainframe computer, and the like.

Figure 5:
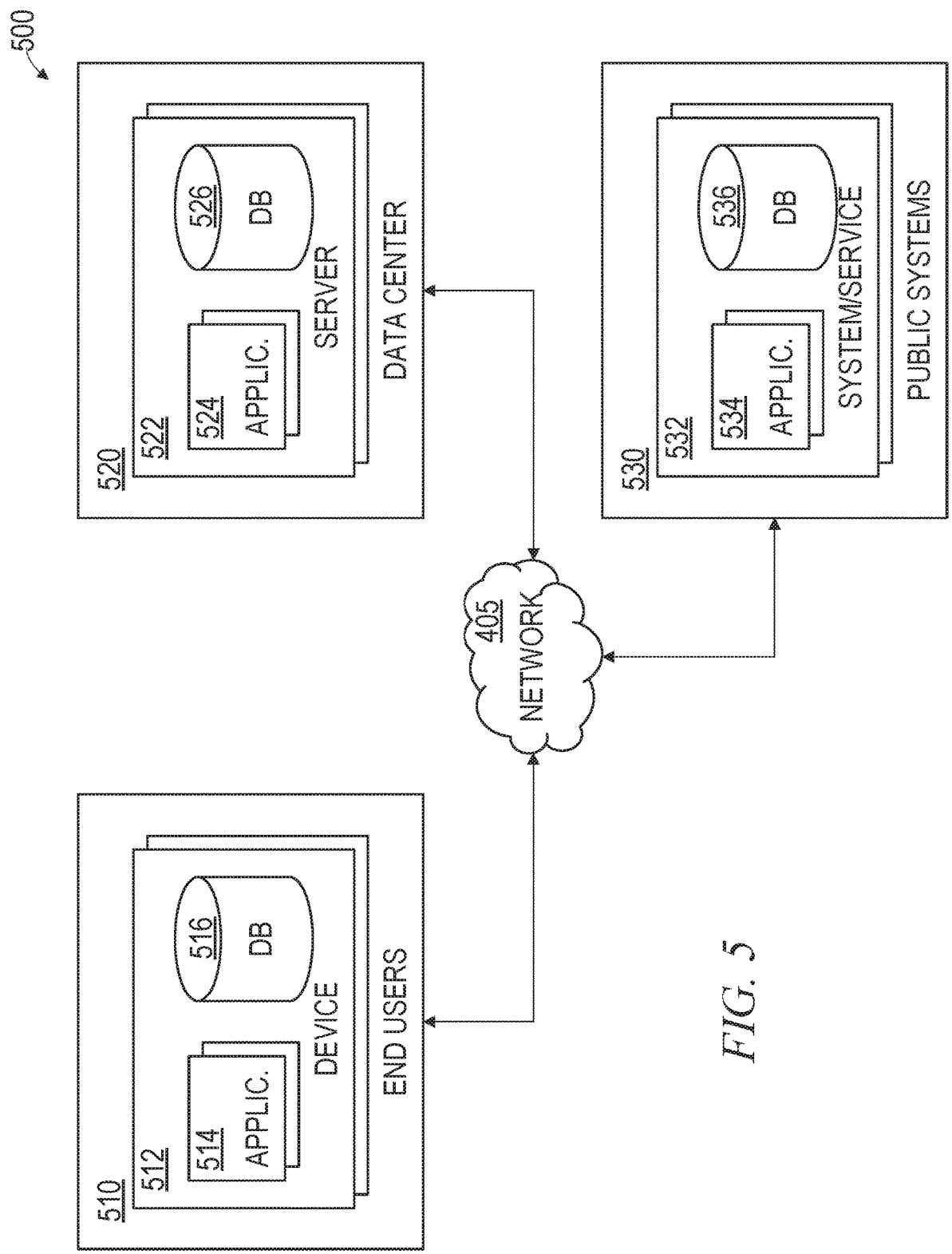
FIG. 5 is a block diagram of a distributed computing system.

FIG. 5 is a block diagram of a distributed system 500 that may include a client-server architecture or cloud computing system. The system 500 may be a system 10 as described above. Distributed system 500 may have one or more end users 510. An end user 510 may have various computing devices 512, which may be machines 400 as described above. The end-user computing devices 512 may comprise applications 514 that are either designed to execute in a stand-alone manner, or interact with other applications 514 located on the device 512 or accessible via the network 405. These devices 512 may also comprise a data store 516 that holds data locally, the data being potentially accessible by the local applications 514 or by remote applications.

The system 500 may also include one or more data centers 520. A data center 520 may be a server 522 or the like associated with a business entity that an end user 510 may interact with. The business entity may be a computer service provider, as may be the case for a cloud services provider, or it may be a consumer product or service provider, such as a retailer. The data center 520 may comprise one or more applications 524 and databases 526 that are designed to interface with the applications 514 and databases 516 of end-user devices 512. Data centers 520 may represent facilities in different geographic locations where the servers 522 may be located. Each of the servers 522 may be in the form of a machine(s) 400.

The system 500 may also include publicly available systems 530 that comprise various systems or services 532, including applications 534 and their respective databases 536. Such applications 534 may include news and other information feeds, search engines, social media applications, and the like. The systems or services 532 may be provided as comprising a machine(s) 400.

The end-user devices 512, data center servers 522, and public systems or services 532 may be configured to connect with each other via the network 405, and access to the network by machines may be made via a common connection point or different connection points, e.g. a wireless connection point and a wired connection. Any combination of common or different connections points may be present, and any combination of wired and wireless connection points may be present as well. The network 405, end users 510, data centers 520, and public systems 530 may include network hardware such as routers, switches, load balancers and/or other network devices.

Other implementations of the system 500 are also possible. For example, devices other than the client devices 512 and servers 522 shown may be included in the system 500. In an implementation, one or more additional servers may operate as a cloud infrastructure control, from which servers and/or clients of the cloud infrastructure are monitored, controlled and/or configured. For example, some or all of the techniques described herein may operate on these cloud infrastructure control servers. Alternatively, or in addition, some or all of the techniques described herein may operate on the servers 522.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products.

Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like. The code may also be intangibly stored on one or more non-transitory and non-volatile computer readable media, such as those described above. In these cases, instructions resident on the media are read and executed by a processor to perform various functions.

The above description is intended to be illustrative, and not restrictive. For example, the above-described examples (or one or more aspects/configurations thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it should not be used to interpret or limit the scope or meaning of the claims.

Also, in the above Detailed Description, various features may be grouped together to streamline the disclosure. However, the claims cannot set forth every feature disclosed herein, as embodiments may feature a subset of said features. Further, embodiments may include fewer features than those disclosed in a particular example. Thus, the following claims are hereby incorporated into the Detailed Description, with a claim standing on its own as a separate embodi-

The invention claimed is:

1. A computer-implemented method for managing a collaboration portal, comprising:
    receiving, from a transferor, via a network interface:
    resource transfer information, comprising:
    identification of resources for a future transfer;
    identification of transferees comprising the transferees to whom the resources will transfer to in the future; and
    transfer instructions related to the future transfer of the resources to the transferees; and
    access instructions that allow the transferees to access the resource transfer information;
    storing the resource transfer information in a resource transfer database that resides in a non-volatile memory of the collaboration portal;
    receiving, from a transferee, via the network interface, a request to access the resource transfer information; and
    providing, to the transferee via the network interface, limited access to the resource transfer information based on the access instructions, the limited access including anonymization of information based on resources designated for transfer to the transferee, using a processor of the collaboration portal.

2. The method of claim 1, further comprising:
    modifying the resource transfer information; and
    providing, to the transferee, access to the modified resource transfer information.

3. The method of claim 1, further comprising:
    locating potential transferees, by a matching routine, based on descriptive information associated with a first resource, the locating using the descriptive information as search criteria;
    presenting the located potential transferees to a benefactor;
    updating the resource transfer information based on benefactor selected data selected from the presented located potential transferees.

4. The method of claim 3, further comprising:
    providing information to the potential transferees about the first resource; and
    receiving information from the potential transferees related to the first resource.

5. The method of claim 3, wherein the potential transferees comprise organizations having a relationship with a first resource type.

6. The method of claim 1, wherein the transfer instructions include conditions for transferring the resource to the transferee.

7. The method of claim 1, further comprising applying user-provided metadata tags to the transfer instructions.

8. The method of claim 7, wherein the metadata includes at least one of section identifiers, transferees, access control information, a description of a resource, transfer conditions, or key dates.

9. The method of claim 1, further comprising:
    assessing a value of the resources and providing it to the transferor or the transferee.

10. The method of claim 1, further comprising:
    making a recommendation to the transferor for allocating resources to the transferee utilizing a historical database comprising past resource allocations between historical transferors and historical transferees.

11. The method of claim 1, further comprising:
    making a recommendation to the transferor for allocating resources to the transferee utilizing a risk analysis tool.

12. The method of claim 1, further comprising:
    adjusting the resource transfer information over time based on a long-term planning tool that factors in an age of the transferor or the transferee.

13. The method of claim 1, wherein the matching routine utilizes an artificial intelligence technique, a weighted factor analysis, or heuristic rules in determining the potential transferees.

14. The method of claim 1, wherein the potential transferees include relatives of the transferor.

15. The method of claim 1, wherein:
    the resource is a benefactor asset;
    the transferees are benefactors to whom the asset will transfer; and
    the transfer instructions are at least partially contained in a digital will.

16. A system for managing a collaboration portal, comprising:
    a hardware processor;
    a storage device comprising a nonvolatile memory and connected to the hardware processor comprising:
    resource transfer information, comprising:
    identification of resources for a future transfer;
    identification of transferees comprising the transferees to whom the resources will transfer to in the future; and
    transfer instructions related to the future transfer of the resources to the transferees; and
    access instructions that allow the transferees to access the resource transfer information;
    a network interface via which:
    a request to access the resource transfer information is received from a transferee; and
    limited access to the resource transfer information based on the access instructions is provided, utilizing the processor, to the transferee, the limited access including anonymization of information based on resources designated for transfer to the transferee.

17. The system of claim 16, wherein:
    the network interface is configured to receive search criteria related to a first resource;
    the processor is configured to:
    locate potential transferees, using a matching routine, based on the search criteria;
    present the located potential transferees to a benefactor; and
    update the resource transfer information based on benefactor selected data selected from the presented located potential transferees.

18. The system of claim 17, wherein the processor is configured to:
    provide information to the potential transferees about the first resource; and
    receive information from the potential transferees related to the first resource.

19. A non-transitory computer-readable storage medium, the computer-readable storage medium including instructions that when executed by a processor, cause the processor to:
    receive, from a transferor:
    resource transfer information, comprising:
    identification of resources for a future transfer;
    identification of transferees comprising the transferees to whom the resources will transfer to in the future; and
    transfer instructions related to the future transfer of the resources to the transferees; and access instructions that allow the transferees to access the resource transfer information, wherein the resource transfer information is stored in a memory of a collaboration portal;

receive, from a transferee, via a network interface, a request to access the resource transfer information; and provide, to the transferee, limited access to the resource transfer information based on the access instructions, the limited access including anonymization of information based on resources designated for transfer to the transferee, using a processor of the collaboration portal.

20. The non-transitory computer-readable storage medium media of claim 19, wherein the instructions further cause the processor to:

locate potential transferees, using a matching routine, based on search criteria related to a first resource;

present the located potential transferees to a benefactor; and update the resource transfer information based on benefactor selected data selected from the presented located potential transferees.

* * * * *

UNITED STATES PATENT AND TRADEMARK OFFICE
CERTIFICATE OF CORRECTION

PATENT NO. : 10,748,117 B1
APPLICATION NO. : 15/654202
DATED : August 18, 2020
INVENTOR(S) : Zhuo et al.

Page 1 of 1

It is certified that error appears in the above-identified patent and that said Letters Patent is hereby corrected as shown below:

In the Claims

In Column 15, Line 13, in Claim 20, after "medium", delete "media"

Signed and Sealed this
Twelfth Day of January, 2021

Andrei Iancu
*Director of the United States Patent and Trademark Office*